Feb. 27, 1962 H. L. BAUMBACH ET AL 3,022,941

PERFORATED TAPE READER

Filed May 7, 1959 3 Sheets-Sheet 1

INVENTORS
HARLAN L. BAUMBACH
ARTHUR L. FORD
BY Forrest J. Lilly
ATTORNEY

Feb. 27, 1962 H. L. BAUMBACH ET AL 3,022,941

PERFORATED TAPE READER

Filed May 7, 1959 3 Sheets-Sheet 2

INVENTORS
HARLAN L. BAUMBACH
ARTHUR L. FORD
BY Forrest J. Lilly
ATTORNEY

INVENTORS
HARLAN L. BAUMBACH
ARTHUR L. FORD
BY Forrest J. Lilly
ATTORNEY

United States Patent Office 3,022,941 Patented Feb. 27, 1962

3,022,941

PERFORATED TAPE READER

Harlan L. Baumbach, Los Angeles, and Arthur L. Ford, Granada Hills, Calif., assignors, by mesne assignments, to Pacific Industries, Inc., San Francisco, Calif., a corporation of California Filed May 7, 1959, Ser. No. 811,746
18 Claims. (Cl. 235—61.11)

This invention deals generally with automatic control equipment, and more particularly with a reader for perforated information storage tapes.

Many different types of tape readers have been devised. One widely used type of tape reader comprises, briefly, a frame having a read-out station, past which a tape is adapted to be advanced to align successive groups of perforations on the tape with a series of yieldably extended read-out pins at the station, and operating means for sequentially retracting the read out pins, advancing the tape from one perforation group to the next, and then releasing the read-out pins for return to their normal extended positions. Those pins which are aligned with perforations in the tape return to their extended positions when thus released. Pins not aligned with perforations in the tape, on the other hand, are retained by the latter in their retracted positions. The position occupied by each read-out pin is sensed in some way, such as by means of a microswitch operated by each pin. The present invention is concerned with a tape reader of this general type.

With the foregoing preliminary discussion in mind, a general object of the invention may be stated as being the provision of an improved and simplified perforated tape reader of the character described.

A more specific object of the invention is to provide a perforated tape reader of the character described having an appreciably simplified construction embodying a reduced number of simple and inexpensive components.

Another object of the invention is to provide a perforated tape reader of the character described which is simple in its action, relatively immune to maloperation, and readily serviced, when needed, by relatively unskilled personnel.

Yet another object of the invention is to provide a perforated tape reader of the character described in which sequential retraction of the read-out pins, advancing of the tape, and final release of the read-out pins is accomplished by the action of a single common operating member.

A further object of the invention is to provide a perforated tape reader of the character described which is relatively compact in size, light weight, inexpensive to manufacture, and otherwise especially well suited to its intended purposes.

Other objects, advantages and features of the invention will become readily apparent as the description proceeds.

Briefly, the objects of the invention are attained by providing a perforated tape reader equipped, in the usual way, with a frame having a read-out station, a series of yieldably extended read-out pins at the station, and a movable tape feed member on the frame for advancing a perforated information storage tape past the read-out station to align succesive perforation groups on the tape with the read-out pins. The pins are retracted, the feed member moved to advance the tape, and the pins released for sensing the perforation group currently aligned therewith by the action of a single, common operating member movable on the frame. The operative connections between this member and the read-out pins and tape feed member incorporate unique last motion means which simply and inexpensively achieve the sequential timing involved in the operation of the reader.

In one illustrative form of the invention, the tape feed member comprises a reciprocable tape feed bar which, and the read-out pin retracting means, are actuated through novel lost motion connections from a common solenoid driven operating slide. In a second form of the invention, the tape feed member comprises a rotary feed wheel which, and the read-out retracting means, are actuated from a common solenoid operated plunger.

A better understanding of the invention may be had from the following detailed description thereof, taken in connection with the annexed drawings, wherein.

Figure 4:
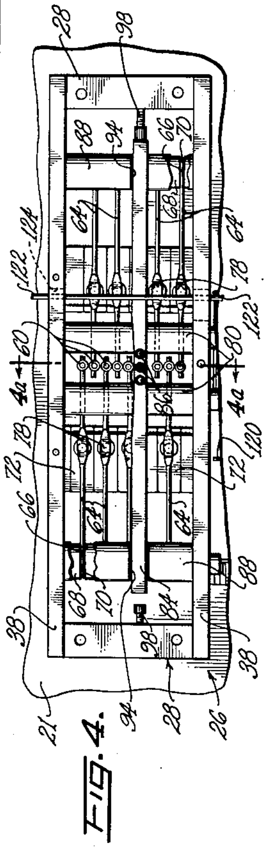
FIG. 4 is a top plan view of the read-out station of the reader with the tape guide removed to expose the read-out pins and other elements therebelow.
Figure 5:
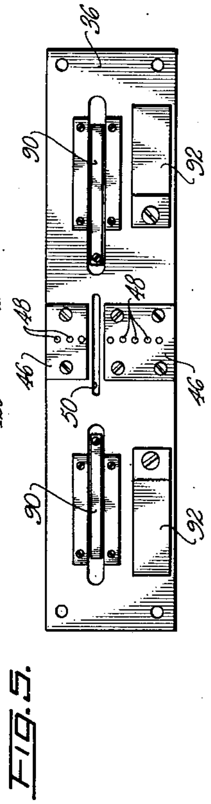
Figure 7:
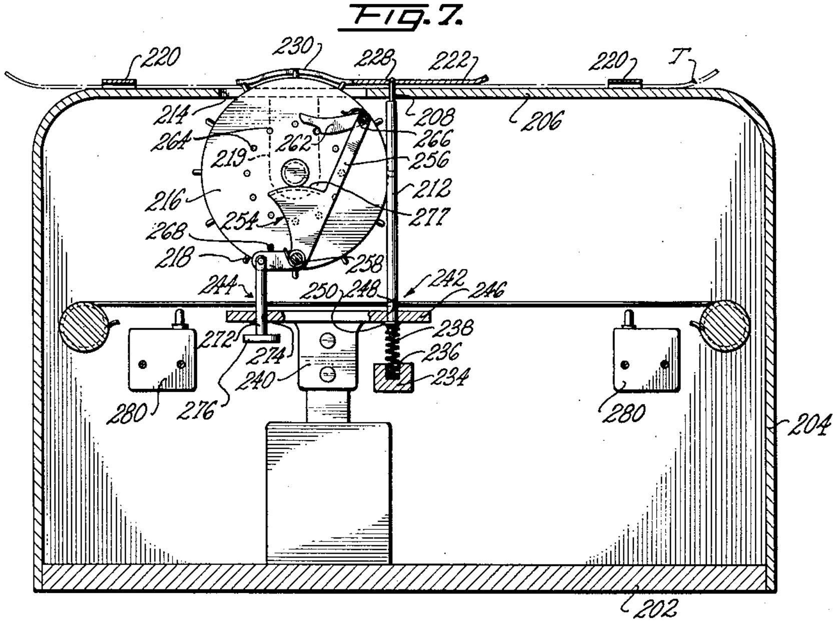
Figure 8:
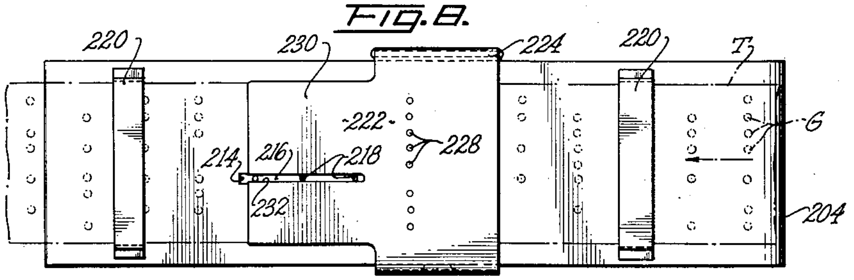
Figure 4A:
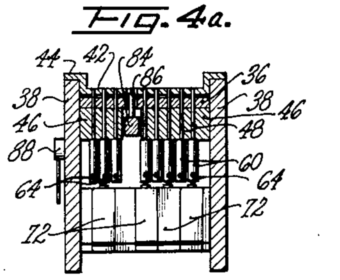

FIG. 4*a* is a section taken along line 4*a*—4*a* of FIG. 4;

FIG. 5 is a view of the underside of the tape guide which normally covers the parts of the tape reader illustrated in FIG. 4;

FIGS. 6*a* through 6*d* illustrate the sequential actions which occur during operation of the present tape reader;

FIG. 7 is a side elevation in section of a modified form of the present tape reader which employs a rotary rather than a reciprocatory tape feed member;

FIG. 8 is a top plan view of the reader of FIG. 7; and

Figure 9:
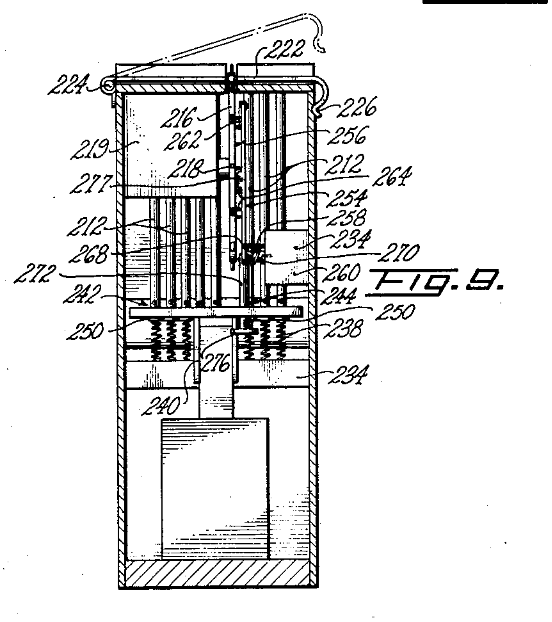

FIG. 9 is a transverse section through the reader of FIG. 8.

Referring first to FIGS. 1 through 6 of the present drawings, the tape reader illustrated therein will be seen to comprise a frame 20 including a base 21, to which is attached the outer housing or case 22 of the reader. This case has, for simplicity, been illustrated as having a generally rectangular configuration. So far as the present invention is concerned, however, the case, as well as the other hereinafter described parts of the reader, may have a wide variety of other suitable shapes and constructions.

Located adjacent the right-hand end of the frame 20 is the read-out station 24 of the reader. This read-out station is made up of an internal supporting structure or frame 26 comprising a rectangular, box-like frame structure 28 having an open top and bottom. Bolted to the opposite end walls of this frame structure are a pair of L-shaped brackets 30 having horizontal legs which are fastened by screws 32 to upstanding lugs 34 on the main frame 20.

Bolted to and normally closing the upper side of the frame structure 28 is a plate 36. As may be observed most clearly in FIG. 3, the upper edges of the side walls 38 of the frame structure 28 project above a plate 36 so as to define with the latter a guideway 40 for receiving a perforated information storage tape T (FIG. 2) which rests on and is supported by the plate 36. Indicated at 42 is a tape hold-down plate which is located intermediate the ends of the tape supporting plate 36. Again, as may be observed most clearly in FIG. 3, the tape hold-down plate 42 is set in between the upper projecting edge portions of the side walls 38, so as to be only slightly spaced from the plate 36 a distance approximately equal to the thickness of the tape to be read. The hold-down plate has side flanges 44 which are located above the hold-down plate proper and seat on the upper edges of the side walls 38. These flanges are bolted to the side walls to retain the hold-down plate in position. During operation of the tape reader then, the tape being read is fed along the guideway 40 and through a narrow space between the tape supporting plate 36 and the tape hold-down plate 42.

Tape supporting plate 36, tape hold-down plate 42 and a pair of guide blocks 46 (FIG. 5) bolted to the underside of the tape supporting plate 36 are formed with a series of eight aligned bores or holes 48 in which the read-out pins of the reader are slidably movable, as will be presently seen. As shown, the holes 48 are arranged in a row extending transverse to the tape guideway 40.

The holes 48 are arranged in two groups of five holes and three holes, respectively. These two groups of holes are located at opposite sides of aligned slots 50 in the tape supporting plate 36 and hold-down plate 42. The slots 50 are offset slightly to one side of the center line of and extend longitudinally of the tape guideway 40. In FIG. 5, it will be observed that the guide blocks 46 are spaced a small distance to opposite sides of the slots 50.

The right-hand end of the tape hold-down plate 42 has a rectangular opening 52 in which is located a pressure roller 54. This roller is rotatably held in position in the opening 52 and resiliently urged against the tape supporting plate 36 by a pair of circularly curved spring arms 56 on a spring 58 which is attached to the right-hand end of the tape supporting plate.

The read-out pins of the present reader are indicated in the drawings by the numeral 60 and are most readily seen in FIGS. 4 and 6*a* through 6*d*. Each pin comprises a reduced upper end 62 and is slidable in the holes 48 of the tape support plate 36, hold-down plate 42 and guide blocks 46 on the underside of the tape support plate. As shown in FIGS. 6*a* through 6*d*, and as will hereinafter be more fully described, the read-out pins 60 are movable between the lower retracted position, illustrated in FIG. 6*b*, wherein the upper extremities of the pins are disposed below the upper surface of the tape support plate 36, and the upper extended position of FIG. 6*a* wherein the upper extremities of the pins extend across the space between the tape supporting plate 36 and hold-down plate 42, and into the holes 48 in the latter plate.

Extending transversely through the lower end of each read-out pin 60 is a spring arm 64. As may be observed most clearly in FIG. 4, the spring arms 64 extend, in alternate fashion, toward the left-hand and right-hand ends of the supporting frame structure 28. The spring arms 64 have circularly bent outer ends 66 which rotatably encircle shafts or pins 68, extending between and fixed at opposite ends in the side walls 38 of the supporting structure 28. The pins 68 have circumferential grooves 70 in which the circularly curved ends 66 of the spring arms 64 are disposed. From this description, it is evident that the spring arms 64 are swingable in vertical planes, about their supporting pins 68 to accommodate extension and retraction of the read-out pins 60. The arms 64 have a relatively loose fit in their respective read-out pins 60, so that these parts may pivot during such extensile and retractile movement.

Located below and intermediate the ends of each spring arm 64 is a microswitch 72. These microswitches are supported between the side walls 38 of the supporting structure 28 in any convenient way, such as by means of slender bolts 74 which pass through the side wall 38 and the housings of the microswitches 72. The spring arms 64 and microswitches 72 are arranged in groups of four at opposite sides of the row of eight read-out pins 60, as illustrated.

Each microswitch 72 has a spring extended plunger 76 which engages a flattened center portion 78 on its respective spring arm 64. The plunger springs within the microswitches 72, therefore, urge the spring arms 64 and the read-out pins 60 connected thereto upwardly toward their normal extended positions of FIG. 6*a*. Microswitches 72 may be of the type which are either normally open or closed when the read-out pins 60 are in their normal extended position of FIG. 6*a* and are closed or opened, as the case may be, when the spring arms 64 and read-out pins 60 are in their lower or retracted positions of FIG. 6*b*.

As will presently be described in greater detail, all of the read-out pins 60 are moved to their retracted positions just prior to each advancing of the tape through the reader. The pins are retracted in this way by the action of reader pin actuating means comprising a pair of reader pin operating or retracting members 80. These members illustratively comprise shafts which are rotatably supported at opposite ends in the side walls 38 of the frame structure 28 for turning on axes parallel to the spring arm supporting pins 68. Shafts 80 have flattened sides 82 which, in the normal positions of the shafts, parallel the spring arms 64 and against which the latter are pressed by the springs in the microswitches 72. In the normal positions of the reader pin operating shafts 80, therefore, the flat faces 82 thereof act as limit stops to limit upward extension of the read-out pin 60 under the action of the microswitch springs to their upper extended positions of FIG. 6*a*. When the shafts 80 are turned from their positions of FIG. 6*a* to their positions of FIG. 6*b*, they effect a downward camming action on the spring arms 64 which moves the read-out pins 60 to their retracted positions of FIG. 6*b*. Thus, it is evident that the read-out pins 60 are shifted between their extended positions of FIG. 6*a* and their retracted positions of FIG. 6*b* by oscillation of the reader pin retracting shafts 80 between their positions illustrated in these figures.

As will shortly be described, immediately after retraction of the read-out pins 60 at the outset of each operating cycle of the reader, the information storage tape is advanced through the reader to align the following perforation group G on the tape with the row of reader pins 60. This advancing of the tape is accomplished by the action of a reciprocable tape advance member or bar 84. This bar carries at its center a series of three parallel, upstanding sprocket pins 86 which extend upwardly through the slot 50 in the tape support plate 36. These sprocket pins are engageable in the sprocket holes S (FIG. 2) of the information storage tape T, which holes are arranged in a row offset slightly to one side of the center line of the tape, as shown in the drawings. To facilitate extension of the sprocket pins 86 through the sprocket holes S, the upper extremities of the pins are reduced slightly, as shown.

The tape feed bar 84 is slidably supported at opposite ends by a pair of shafts 88 which are rotatably mounted in the side walls 38 of the frame structure 28, adjacent the opposite ends of the latter. The feed bar is held in contact with the shafts 88 by means of a pair of leaf spring 90 fixed to the underside of the tape supporting plate 36. A second pair of leaf springs 92, fixed to the underside of the tape supporting plate 36, bear against the shafts 88 to frictionally restrain the latter against rotation, for reasons to be seen.

The ends of the feed bar 84 seat in circumferential grooves 94 in the shafts 88. The bottom walls of these grooves, against which the ends of the feed bar 84 are urged by the leaf spring 90, have flat portions 96. When the shafts 88 are in their angular positions of FIGS. 6*c* and 6*d*, the ends of the feed bar 84 rest on the flats 96 of the shafts 88 and the tips of the sprocket pins 86 on the feed bar are located just below the upper surface of the tape supporting plate 36. Rotation of the shafts 88 from these latter positions to the positions of FIGS. 6*a* and 6*b* elevates the feed bar 84, as shown, to a position wherein the tips of the sprocket pins 86 extend across the space between tape supporting plate 36 and tape hold-down plate 42 and into the slot 50 in the tape hold-down plate 42.

As will shortly be seen, the tape bar 84 is moved to the left while in its elevated position to advance the tape T through the reader. The feed bar is then dropped to its lowered position, by turning of its supporting shafts 88, and returned to the right in this lowered position. This right and left-hand travel of the feed bar is limited by a pair of stop screws 98 in the opposite end walls of the frame structure 28. These stop screws are adjustable to adjust the travel of the feed bar 84 to equal the spacing between perforation groups G on the tape and to effect alignment of these groups with the read-out pins.

During operation of the reader, the reader pin actuating means or shafts 80, and the feed bar supporting shafts 88 are turned between their limiting positions, and the feed bar 84 is reciprocated by the action of a single operating member or slide 100. This operating slide is mounted on the forward side wall 38 of the frame structure 28, as the latter is viewed in FIG. 1 by means of a pair of bolts 102 which are threaded in the frame structure 28 and slidably engaged in slots 104 in the slide 100. The left end of the slide is fastened by bolt 106 (FIG. 2) to a bracket 108 and to the plunger 110 of a solenoid 112. When the solenoid is energized, the slide 100 is moved to the left in FIG. 1. This left-hand travel of the slide is limited by a stop 113 on the solenoid plunger. As will shortly be seen, when the solenoid 112 is deenergized, the slide 100 is returned to its normal right-hand position by the action of springs.

Figures 1, 6A, 6B, 6C, 6D:
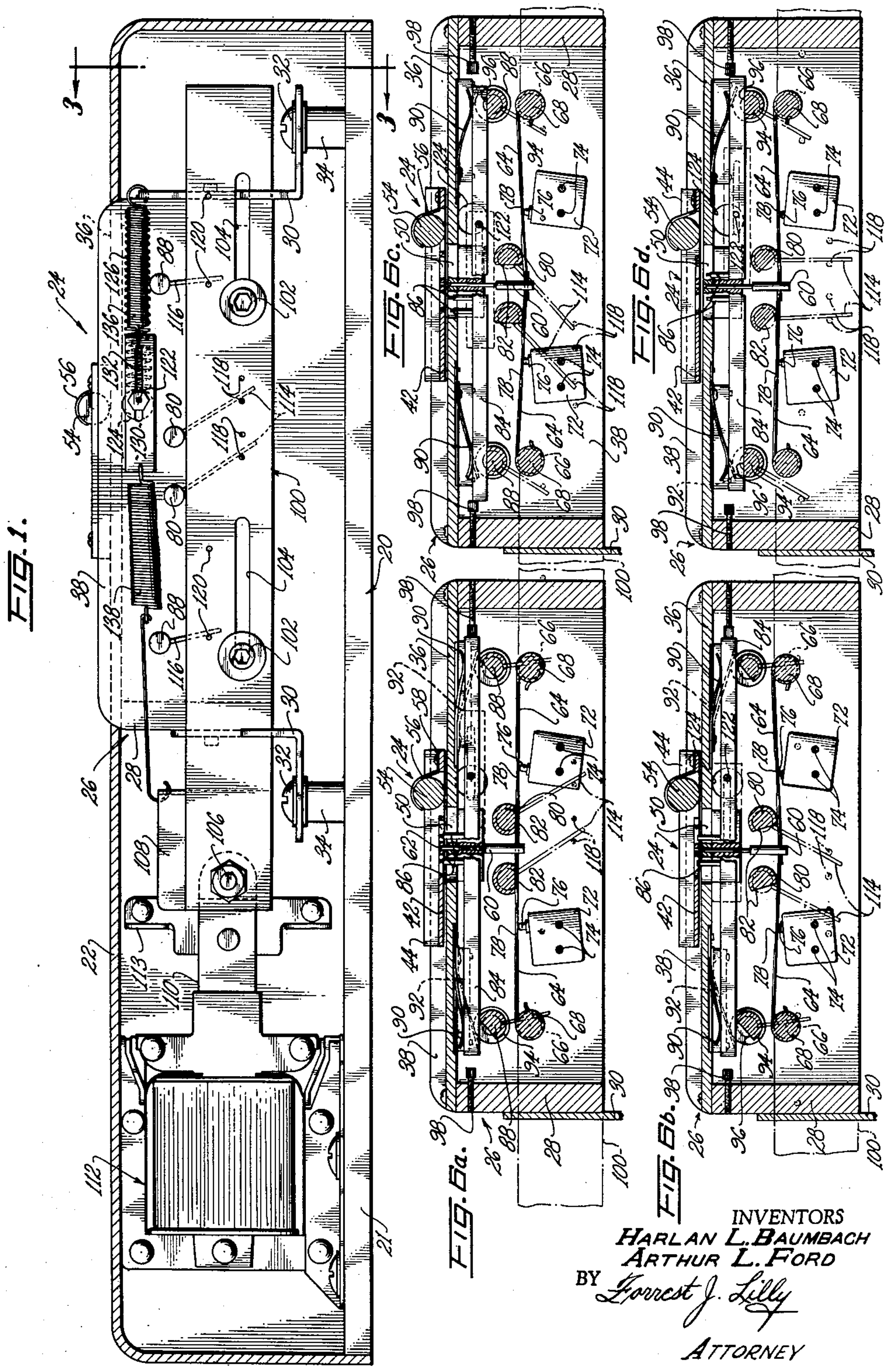
FIG. 1 is a side elevation of one illustrative form of the present tape reader, the walls of the reader housing being broken away for clarity.
Figure 2:
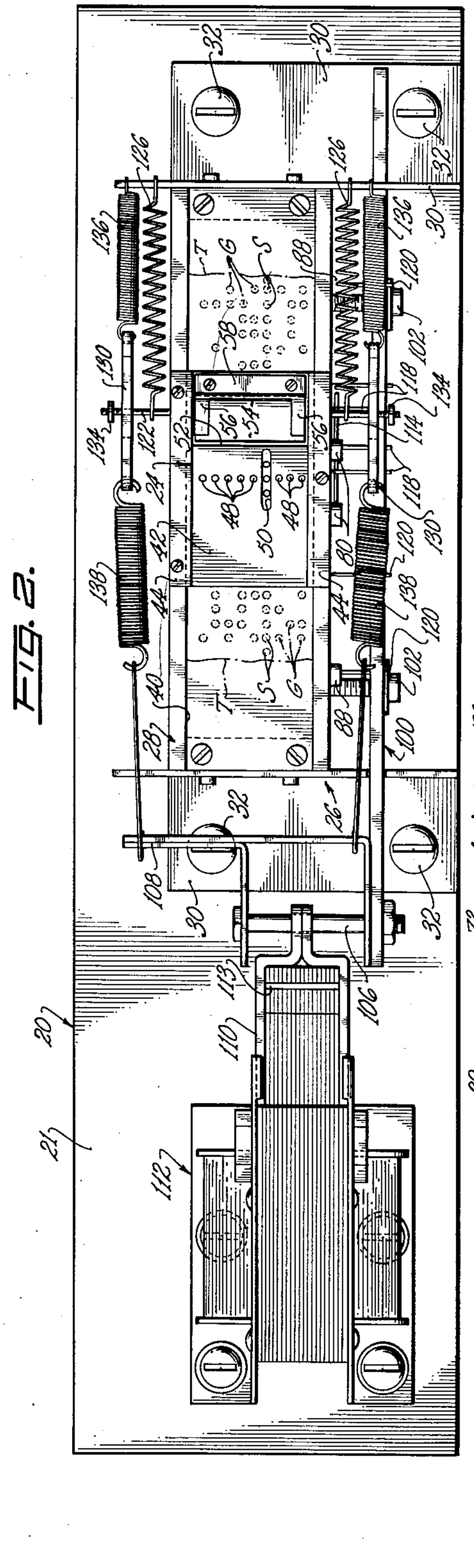
FIG. 2 is a top plan view of the reader of FIG. 1, with the upper part of the reader housing removed.
Figure 3:
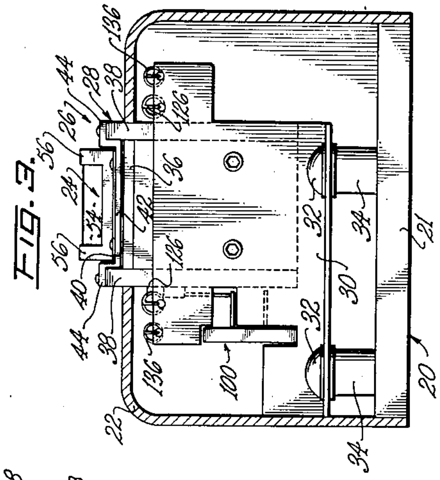
FIG. 3 is a section taken along line 3—3 of FIG. 1.

As shown most clearly in FIGS. 1 and 2, the reader pin retracting shafts 80 and the feed bar supporting shafts 88 project beyond the forward wall 38 of the frame structure 28, as the latter is viewed in FIG. 1. Rigid on the projecting end of each shaft 80 is a radial arm 114 and rigid on the projecting end of each shaft 88 is a radial arm 116. Each arm 114 extends between a pair of pins 118 fixed in and spaced along the slide 100. Similarly, the radial arm 116 on each of the feed bar shafts 88 extends between a pair of pins 120 fixed in and spaced along the slide 100.

As will be shortly more fully described during left-hand travel of the slide 100 from its right-hand limiting position of FIG. 1, the reader pin actuating shafts 80 are turned from their positions of FIGS. 1 and 6*a* to their positions of FIG. 6*b* to cause retraction of the reader pins 60 out of the sprocket holes S in the information storage tape T, by engagement of the right-hand pins 118 on the slide 100 with the radial arms 114 on the shafts 80. Immediately thereafter, the feed bar 84 is moved to feed the tape T through the reader. This movement of the feed bar is accomplished as follows.

As shown most clearly in FIGS. 2 and 4, the tape feed bar 84 has a transverse pin 122 fixed therein. The opposite ends of this pin extend through enlarged holes 124 in the side walls 38 of the frame structure 28 and a distance beyond the outer surfaces of these walls. Connected between the outer extending ends of the pin 122 and the bracket 30 at the right-hand end of the frame structure 28 are a pair of tension springs 126 which bias the feed bar to its right-hand limiting position of FIGS. 4, 6*a* and 6*d*.

Indicated at 130 are a pair of feed bar actuating members or links having slots 132 through which the ends of the pin 122 extend. Nuts 134 are threaded on the ends of the pin 122 to retain the links 130 against axial movement from the pin.

Connected between the right-hand end of the links 130 and the right-hand bracket 30 are a pair of tension springs 136. Connected between the left-hand ends of the links 130 and the bracket 108 attached to the left-hand end of the slide 100 are a pair of tension springs 138. When the slide 100 is in its right-hand limiting position of FIG. 1, the springs 136 and 138, which support the links 130, position the latter so that the feed bar pin 122 is located adjacent the left-hand end of the slots 132 in the links. During left-hand travel of the operating slide by energization of solenoid 112, the links 130 are pulled to the left by the springs 138 which act between the slide and the links. When the solenoid is deenergized, the slide 100 is returned to its right-hand limiting position and the links are returned to their positions of FIG. 1 by the action of the springs 136 and 138. From the foregoing description, it will be seen that the feed bar supporting shafts 88 and actuating links 130 comprise feed bar actuating means which are operatively connected to the operating member or slide 100 for movement by the latter to impart tape feeding movement to the tape feed member or bar 84.

The operation of the reader will now be described. When inserting a tape into the reader, the solenoid 112 is energized to retract the reader pin 60. As will presently be described, energizing of the solenoid also results in retraction of the sprocket pins 86. The tape T to be read is now inserted through the space between the tape supporting plate 36 and tape hold-down plate 42 to a position where a sprocket hole S in the tape, as seen through slot 50 in the hold-down plate 42, is in line with the row of reader pins 60. The solenoid 112 is then deenergized to allow the parts of the reader to return to their positions of FIG. 6*a*. If a blank leader portion of the tape is aligned with the reader pins 60, the latter engage the tape and are retained in their retracted positions wherein all of the microswitches 72 are in their actuated conditions. During the normal operation of the reader, the solenoid 112 is periodically and momentarily energized in any convenient way. During each of these momentary energizations of the solenoid 112, the operating slide 100 is moved from its right-hand limiting position of FIG. 1 to its left-hand limiting position and is then returned to its right-hand limiting position by the action of the springs 136, 138.

At the outset of the left-hand travel of the slide from its right-hand limiting position, the right-hand pins 118 on the slide engage the radial arms 114 on the reader pin retracting shafts 80 and cause clockwise turning of these shafts from their positions of FIG. 6*a* to their positions of FIG. 6*b*. This turning of the shafts retracts the reader pins 60 to their lower positions wherein their tips 62 are disengaged from the perforations P in the tape T. During advancing of a blank leader portion of the tape T through the reader, of course, all of the reader brushes are retained in their retracted positions by engagement of the pins with the tape, as just mentioned.

During this initial left-hand travel of the operating slide 100 to retract the reader pins 60, the links 130 are pulled to the left by the springs 138 which are connected between the slide and the left-hand ends of the links. Owing to the length of the slots 132 in the links through which the ends of the feed bar pin 122 extend, however, the feed bar 84 is retained in its right-hand limiting positions by its biasing springs 126. Links 130 and their slots 132 are so arranged and proportioned that immediately after retraction of the read-out pins 60 during the initial left-hand travel of the operating slide, the end walls of the slots 132 in the links 130 engage the ends of the feed bar pin 122 (FIG. 6*b*) so that the feed bar 84 is thereafter moved to the left with the operating slide. At this time, the feed bar supporting shafts 88 are in their positions of FIG. 6*b* and the feed bar 84 is held in its upper position wherein the sprocket pins 86 engage in sprocket holes S in the tape T. Accordingly, during left-hand movement of the feed bar 84 with the operating slide, the tape T is advanced through the reader.

Left-hand travel of the feed bar 84 is limited by engagement of its left-hand end with the left-hand stop screw 98. The stop screws are adjusted so that the distance through which the tape T is advanced by the feed bar is equal to the spacing between adjacent perforation groups G on the tape. When the feed bar 84 reaches the left-hand limit of its travel, therefore, the next perforation group G in the tape will be aligned with the reader pins 60.

The right-hand pins 120 on the operating slide 100 are so located as to engage the radial arms 116 on the feed bar supporting shafts 88 (FIG. 6*b*) approximately simultaneously with engagement of the feed bar with the left-hand stop screw 98 and prior to the slide reaching the left-hand limit of its travel. During the final travel of the operating slide to its left-hand limiting position (FIG. 6*c*), therefore, the feed bar supporting shafts 88 are rotated in a clockwise direction from their positions of FIG. 6*b*, wherein the feed bar 84 is supported in its elevated position, to their positions of FIG. 6*c* wherein the flats 96 on the supporting shafts are aligned with the feed bar 84 to allow the latter to be urged downwardly to its retracted position (FIG. 6*c*) by the action of the leaf springs 90. In this lower position of the feed bar, sprocket pins 86 are disengaged from the sprocket holes S in the tape T, as already mentioned.

Solenoid 112 is only momentarily energized so that the slide 100 is immediately returned to its right-hand limiting position by the springs 136, 138, as mentioned earlier. During this right-hand travel of the slide, the left-hand pins 118 thereon first engage the radial arms 114 on the read-out pin retracting shafts 80 to rotate the latter (FIG. 6*d*) in a counterclockwise direction back to their initial positions of FIG. 6*a*, wherein the read-out pins 60 are released for extension by the action of their biasing springs within their respective microswitches 72. Those read-out pins which are aligned with a perforation in the tap T, of course, will be moved to their extended positions with resultant return of their respective microswitches to their normal condition. Read-out pins not aligned with a perforation in the tape, on the other hand, are prevented from returning to their extended positions by the tape, and their respective microswitches 72 remain in their actuated conditions. These microswitches are connected in external circuitry (not shown) in the well known way, which is effective to sense which microswitches are actuated and which are not.

During right-hand travel of the operating slide, the left-hand force exerted on the links 130 by their springs 138 is relieved and the links are pulled to the right by their now tensed springs 136. This right-hand movement of the links 130 permits the feed bar 84 to be pulled to the right by the action of its biasing springs 126 which are weak in comparison to the springs 138. At this time, of course, the feed bar is in its lower retracted position wherein its sprocket pins 86 clear the tap T so that the latter does not pull back with the feed bar.

The spacing between the pins 120 on the slide 100 which actuate the feed bar supporting shafts 88 is such that the left-hand pins 120 engage the radial arms 116 on the shafts 88 (FIG. 6*d*) just prior to the slide reaching the right-hand limit of its travel and approximately simultaneously with the feed bar 84 reaching the right-hand limit of its travel against the right-hand stop screw 98 by the action of its springs 126, as just mentioned. During the final right-hand travel of the operating slide back to its position of FIG. 6*a*, therefore, the shafts 88 are rotated in a counterclockwise direction back to their initial positions of FIG 6*a*, to again elevate the feed bar 84 to its upper position of FIG. 6*a* wherein the sprocket pins 86 engage in the sprocket holes S in the tape T, to condition the reader for the next operating cycle.

From the foregoing description and the drawings, it will be evident that the described operative connections between the operating slide 100 and the reader pins actuating means 80 and feed bar actuating means 88, 130 comprise, in effect, lost motion connections which effect the sequential actions that occur during the operation of the reader, namely, initial retraction of the reader pins 60, left-hand movement of the feed bar 84 to advance the tape T through the reader, lowering of the feed bar to retract sprocket pins from the sprocket holes S in the tape, release of the read-out pins 60 for extension under the action of their biasing springs, and finally return of the feed bar 84 to its initial elevated position in readiness for the next actuation of the reader.

Referring now to FIGS. 7–9 of the drawing, the modified tape reader shown comprises a frame 202 to which is attached a housing 204. This housing has an upper wall or plate 206 which supports the tape T to be read for movement in the direction indicated. Formed in the plate 206 is a row of holes 208 which slidably receive the reduced upper ends of a series of read-out pins 212.

Offset from the row of pin holes 208 in the direction of tape movement is a slot 214 in the plate 206. A rotary tape feed member or sprocket wheel 216 within the housing 204 projects through this slot for engagement of drive means or sprocket pins 218 on the wheel in the sprocket holes S in the tape T. This wheel is rotatably supported on a boss 219 on one side wall of the housing 204. The tape feeds through a pair of guides 220 below a tape hold-down plate 222, as shown.

This tape hold-down plate is hinged at one side of the housing 204 by a hinge means 224, for swinging between its solid line closed position and its phantom line open position to facilitate initial engagement of the tape in the reader. One end of the hold-down plate is bent to form a spring latch 226 engageable in a recess in the housing 204 to releasably lock the hold-down plate in its closed position.

One part of the hold-down plate overlies the read-out pins 212 in the closed position of the plate. This parts has holes 228 to receive the tips of the hold-down pins when the latter are extended. The hold-down plate has another curved part 230 which overlies the sprocket wheel 216. This part has a slot 232 to receive the wheel so that the tape T is held in contact with the sprocket pins 218 on the wheel during its movement past the wheel.

Extending across the inside of the housing 204, below the read-out pins 212, is a spring support 234. This support has holes 236 aligned with the read-out pins 212, respectively, to receive springs 238 for biasing the read-out pins to their extended positions.

During operation of the modified reader, the read-out pins are retracted and the sprocket wheel 216 is rotated by movement of a single reciprocable operating member 240 through intermediate actuating means 242 and 244. These actuating means are engageable with the read-out pins 212 and sprocket wheel 216, respectively, and operatively connected to the operating member 240 for retraction of the pins and rotation of the wheel by movement of the single operating member, as in the previous form of the reader.

Actuating means 242 comprises a right-hand lateral extension 246 on the operating member 240, having holes 248 through which the lower ends of the read-out pins 212 slidably extend, and shoulders 250 on the pins. When the operating member 240 moves downwardly, therefore, extension 246 engages the pin shoulders 250 to retract the pins 212 against the action of their springs 238. The pins are released for yieldable extension by upward movement of the operating member to its normal position of FIG. 7, of course.

The actuating means 244 for the sprocket wheel 216 comprise a left-hand lateral extension 252 on the operating member 240 and a ratcheting device 254 operated from this extension. Ratcheting device 254 consists of a pivoted carrier or bell crank lever 256 which is hinged at 258 to a boss 260 on one side wall of the housing 204. Pivoted on the outer end of one arm of this lever is a pawl 262. This pawl is engageable with pins 264 on one side of the sprocket wheel 216 to rotate the latter in a counterclockwise direction when the lever swings in that direction. When the lever swings in the opposite direction, the pawl 262 merely rides over the pins 264 in the well-known way. The pawl is biased by a small spring-leaf 266.

The bell crank lever 256 is biased in the clockwise direction to a normal position against a stop 268 by a torsion spring 270 anchored at one end to the lever and at the other to the lever support 260. The lever is rocked against the action of this spring to rotate the sprocket wheel 216 by a link 272 hinged to the other arm of the lever. This link extends loosely through a hole 274 in the extension 252 and has a shoulder 276 at its lower end. Shoulder 276 is engaged by extension 252 during downward movement or retraction of the operating member 240 to cause counterclockwise swinging of the lever 256 and rotation of the sprocket wheel 216 the proper amount for advancing of the tape T from one perforation group G to the next. A curved stop 277 on the lever moves in front of a pin 264 on the wheel to limit rotation of the latter to this proper amount.

Operating member 240 is fixed to the upper end of the plunger of a solenoid 278. When this solenoid is energized, the operating member 240 is pulled down to retract the read-out pins 212 and rotate the sprocket wheel 216.

As in the first form of the reader, it is necessary that the read-out pins 212 be retracted before the sprocket wheel 216 is rotated to advance the tape T through the reader. To this end, it will be observed that the length of the link 272 is such that its shoulder 270 is engaged by the left-hand extension 252 on the operating member 240 after the right-hand extension 246 has retracted the read-out pins 212. The operative connection between the operating member 240 and the sprocket wheel 216 therefore forms a lost motion means which effects the necessary sequential timing as before.

When the solenoid 278 is deenergized to effect resetting of the ratcheting device 254 and release the read-out pins, the latter are yieldably extended by their springs 238 or retained in a retracted position in accordance with the perforations in the tape T, as before. The positions of the pins are sensed by spring arm and microswitch means 280, as before.

It is obvious, therefore, that the tape readers hereinbefore described are fully capable of attaining the objects preliminarily set forth.

While certain preferred forms of the invention have been disclosed for illustrative purposes, numerous modifications in the design, arrangement of parts and instrumentalities of the invention are possible within the scope of the following claims.

We claim:

1. In a perforated tape reader, the improvements comprising: a frame; a movable tape feed member on the frame for advancing an information storage tape through the reader; a plurality of yieldably extended read-out pins on the frame; a movable operating member on the frame; an actuating means operatively mechanically connected to said operating member for movement by the latter and engageable with said read-out pins to retract the latter upon movement of the operating member from a normal position thereof; and a mechanical lost motion connection between said operating member and tape feed member for moving the latter to advance the tape through the reader after retraction of said read-out pins by said actuating means.

2. In a perforated tape reader, the improvements comprising: a frame; a movable tape feed member on the frame for advancing an information storage tape through the reader; a plurality of yieldably extended read-out pins on the frame; a reciprocatory operating member mounted on said frame for movement between a normal position and a limiting position; an actuating member operatively connected to said operating member for movement by the latter and engageable with said read-out pins to retract the latter during movement of said operating member from said normal position, through said limiting position, to said normal position; and a lost motion connection between said operating member and tape feed member for moving the latter to advance the tape through the reader during said movement of the operating member and after retraction of said read-out pins by the actuating member.

3. In a perforated tape reader, the improvements comprising: a frame; a movable tape feed member on the frame for advancing an information storage tape through the reader; a plurality of yieldably extended read-out pins on the frame; a reciprocatory operating member mounted on said frame for movement between a normal position and a limiting position; a first actuating means operatively connected to said operating member for movement by the latter and engageable with said read-out pins to retract the latter during movement of said operating member from said normal position, through said limiting position, to said normal position; a second actuating means operatively connected to said operating member for movement by the latter and drivingly engageable with said tape feed member to move the latter and advance the tape through the reader during said movement of said operating member and after retraction of the read-out pins by said first actuating means; and a solenoid means for reciprocating said operating member.

4. In a perforated tape reader, the improvements comprising: a frame; a movable tape feed member on the frame for advancing an information storage tape through the reader; a plurality of yieldably extended read-out pins on the frame; a reciprocatory operating member mounted on said frame for movement between a normal position and a limiting position; an actuating member operatively connected to said operating member for movement by the latter and engageable with said read-out pins to retract the latter during movement of said operating member from said normal position, through said limiting position, to said normal position; a mechanical lost motion connection between said operating member and tape feed member for moving the latter to advance the tape through the reader during said movement of the operating member and after retraction of said read-out pins by the actuating member; and a solenoid means for reciprocating said operating member.

5. In a reader for a perforated information storage tape, the improvements comprising: a frame; a plurality of yieldably extended read-out pins on the frame; a reciprocable operating member mounted on the frame for reciprocation between a normal position and a limiting position; means operated by said member for sequentially retracting said read-out pins, advancing a perforated tape a predetermined distance past the reader, and releasing said read-out pins for yieldable extension of the latter during each reciprocation of said member from said normal position, to said limiting position, and back to said normal position; and means for reciprocating said member.

6. In a reader for a perforated information storage tape, the improvements comprising: a frame; a plurality of yieldably extended read-out pins on the frame; a reciprocable operating member mounted on the frame for reciprocation between a normal position and a limiting position; means operated by said member for sequentially retracting said read-out pins, advancing a perforated tape a predetermined distance past the reader, and releasing said read-out pins for yieldable extension of the latter during each reciprocation of said member from said normal position, to said limiting position, and back to said normal position; and a solenoid means for reciprocating said member.

7. In a reader for a perforated information storage tape, the improvements comprising: a frame; a plurality of yieldably extended read-out pins on the frame; a reciprocable operating member mounted on the frame for reciprocation between a normal position and a limiting position; means operated by said member for sequentially retracting said read-out pins, advancing a perforated tape a predetermined distance past the reader, and releasing said read-out pins for yieldable extension of the latter during each reciprocation of said member from said normal position, to said limiting position, and back to said normal position; and a solenoid means for reciprocating said member including a plunger element integral with said member and an electromagnetic coil about said element.

8. In a perforated tape reader, the improvements comprising: a frame having a read-out station past which a perforated information storage tape is adapted to move; a reciprocable tape feed bar on the frame movable lengthwise of the tape and having drive means engageable with the tape to feed the latter; a plurality of normally yieldable extended read-out pins at said station; and operating means for sequentially retracting said pins, moving said feed bar in one direction of the tape from a given normal position of the bar with said drive means engaged with the tape to advance the latter past said station, returning said feed bar to its normal position along a path wherein said drive means clear the tape, and releasing said read-out pins for yieldable movement of the latter toward their normal extended positions after advancing of the tape by said feed bar.

9. In a perforated tape reader, the improvements comprising: a frame having a read-out station past which a perforated information storage tape is adapted to move; tape feed means including a reciprocable tape feed bar having drive means engageable with the tape to feed the latter, and means mounting said bar on the frame for movement in one lengthwise direction of the tape with said drive means engaged with the tape to feed the latter past said station and in the opposite direction with said drive means disengaged from the tape; read-out means on the frame including a plurality of normally yieldably extended read-out pins at said station, and means for retracting said pins; and operating means including a movable operating member on the frame and lost motion connections between said operating member and said tape feed means and read-out means for effecting sequential retraction of said read-out pins, movement of the feed bar in said one direction with said drive means engaged with the tape to advance the latter past said station and subsequent movement of the bar in the opposite direction with said drive means disengaged from the tape to return the bar to a normal position thereof, and release of said read-out pins for yieldable movement of the latter toward their normal extended positions after advancing of the tape by said feed bar.

10. The subject matter of claim 9 wherein said operating member comprises a reciprocable operating slide, and solenoid means for reciprocating said slide.

11. In a perforated tape reader, the improvements comprising a frame having a read-out station past which a perforated information storage tape is adapted to move; a rotary feed wheel on the frame for advancing the tape past said station; a plurality of normally yieldably extended read-out pins on said frame at said station; and a movable operating member on the frame initially engageable with said read-out pins to retract the latter and subsequently engageable with said wheel to rotate the latter and advance the tape.

12. The subject matter of claim 11 including solenoid means for moving said operating member.

13. In a perforated tape reader, the improvements comprising a frame having a read-out station past which a perforated information storage tape is adapted to move; a rotary feed wheel on the frame for advancing the tape past said station; a plurality of normally yieldably extended read-out pins on said frame at said station; a movable operating member on the frame; means operatively connected to the member for retracting said read-out pins upon movement of the member to a given position; and a lost motion connection between said member and feed wheel for rotating the latter to feed the tape after retraction of the read-out pins.

14. In a perforated tape reader, the improvements comprising: a frame having a read-out station past which a perforated information storage tape is adapted to move; a reciprocable tape feed bar having drive means engageable with the tape to feed the latter; and means for moving the bar in one lengthwise direction of the tape with said drive means engaged with the tape and in the opposite direction with said drive means disengaged from the tape.

15. In a perforated tape reader, the improvements comprising: a frame having a read-out station past which a perforated information storage tape is adapted to move; a reciprocable tape feed bar having drive means engageable with the tape to feed the latter; movable means supporting said bar on the frame for movement lengthwise of the tape, said movable support means being movable to a first position to guide said bar for movement in one lengthwise direction of the tape to a first limiting position with said drive means engaged with the tape and said support means being movable to a second position to guide said bar for movement in the opposite direction to a second limiting position with said drive means disengaged from the tape; a movable operating member on the frame connected to said feed bar for reciprocating the latter; and means connecting said operating member and support means for moving the latter to said first position thereof upon movement of the feed bar to its second limiting position and moving the support means to said second position thereof upon movement of the feed bar to its first position.

16. In a perforated tape reader, the improvements comprising: a frame having a read-out station past which a perforated information storage tape is adapted to move; a reciprocable tape feed bar having drive means engageable with the tape to feed the latter; movable means supporting said bar on the frame for movement lengthwise of the tape, said movable support means being movable to a first position to guide said bar for movement in one lengthwise direction of the tape to a first limiting position with said drive means engaged with the tape and said support means being movable to a second position to guide said bar for movement in the opposite direction to a second limiting position with said drive means disengaged from the tape; a movable operating member on the frame connected to said feed bar for reciprocating the latter; and lost motion means connecting said operating member and support means for moving the latter to said first position thereof upon movement of the feed bar to its second limiting position and moving the support means to said second position thereof upon movement of the feed bar to its first position.

17. The subject matter of claim 16 including a plurality of yieldably extended read-out pins on said frame at said station; a pin retracting member engageable with said read-out pins to retract the latter; and lost motion connections between said operating member and said retracting member and feed bar for effecting movement of the retracting member to retract the read-out pins prior to movement of said feed bar from its second limiting position by said operating member and release of said read-out pins for yieldable movement of the latter toward their normal extended positions during movement of the feed bar from its first to its second limiting position.

18. In a perforated tape reader, the improvements comprising: a frame; a movable tape feed member on the frame for advancing an information storage tape through the reader; a plurality of yieldably extended read-out pins on the frame; pin retracting means on the frame to retract said read-out pins out of the path of movement of the storage tape through the reader; a movable operating member on the frame; means movable with said operating member for engaging said pin retracting means to retract said read-out pins completely out of said path of movement upon movement of the operating member from a normal position to a first position and subsequently engaging said tape feed member to impart a tape feeding movement thereto during movement of said operating member beyond said first position to a second position; and means for moving said operating member from said normal position, through said first and second positions in succession, and then back to said normal position.

References Cited in the file of this patent

UNITED STATES PATENTS 2,659,767 Zenner ---------------- Nov. 17, 1953